(12) United States Patent
Tsai et al.

(10) Patent No.: US 12,461,065 B2
(45) Date of Patent: Nov. 4, 2025

(54) GLYCAN PROFILING UTILIZING CAPILLARY ELECTROPHORESIS

(71) Applicant: BIOPTIC, INC., New Taipei (TW)

(72) Inventors: Shou-Kuan Tsai, New Taipei (TW); Ming-Jhy Hseu, New Taipei (TW); Varouj D. Amirkhanian, La Crescenta, CA (US)

(73) Assignee: BIOPTIC, INC., New Taipei (TW)

( * ) Notice: Subject to any disclaimer, the term of this patent is extended or adjusted under 35 U.S.C. 154(b) by 947 days.

(21) Appl. No.: 17/539,867

(22) Filed: Dec. 1, 2021

(65) Prior Publication Data

US 2022/0236219 A1    Jul. 28, 2022

Related U.S. Application Data

(63) Continuation of application No. 16/253,159, filed on Jan. 21, 2019, now abandoned, which is a
(Continued)

(51) Int. Cl.
*G01N 27/447* (2006.01)
*G01N 21/64* (2006.01)

(52) U.S. Cl.
CPC ....... *G01N 27/44791* (2013.01); *G01N 21/64* (2013.01); *G01N 27/44721* (2013.01); *G01N 27/44743* (2013.01); *G01N 27/44726* (2013.01)

(58) Field of Classification Search
CPC ....... G01N 27/44791; G01N 27/44721; G01N 27/44726; G01N 27/447–44704;
(Continued)

(56) References Cited

U.S. PATENT DOCUMENTS 5,798,032 A * 8/1998 Khan ............... G01N 27/44773
204/603
8,163,152 B1 * 4/2012 Amirkhanian ... G01N 27/44747
204/605
(Continued)

OTHER PUBLICATIONS

H Birrell, J Charlwood, I Lynch, S North, P Camilleri, A dual-detection strategy in the chromatographic analysis of 2-Aminoacridone-Derived Oligosaccharides, Anal. Chem. 71 (1999) 102-108 (Year: 1999).*
(Continued)

*Primary Examiner* — James Lin
*Assistant Examiner* — Vivian A Tran
(74) *Attorney, Agent, or Firm* — LIU & LIU

(57) ABSTRACT

A method for glycan profiling by capillary electrophoresis (CE), and a CE system for glycan analysis (N-Glycan). The CE system uses integrated dual optical fibers for both radiation excitation and emission detection. The CE system is configured for performing a two-color detection for data analysis. A single radiation excitation source is used to excite two emission fluorophores or dyes in the sample solution to be analyzed. One emission dye is to tag the sample and the other dye is used to provide a reference marker (e.g., a Dextran Ladder) for the sample run. Two detectors (e.g., photomultiplier tubes (PMTs)) are applied to simultaneously detect the fluorescent emissions from the dyes. The data collected by both detectors are correlated (e.g., synchronized, and/or super-positioned for analysis) for accurate data peak identification.

20 Claims, 11 Drawing Sheets

Related U.S. Application Data continuation of application No. 14/720,723, filed on May 22, 2015, now abandoned.

(60) Provisional application No. 62/002,142, filed on May 22, 2014.

(58) Field of Classification Search
CPC ......... G01N 27/44717; G01N 27/4473; G01N 27/44739; G01N 27/44743–44747; G01N 27/44756; G01N 21/64; G01N 2021/174; G01N 2021/4766; G01N 2021/7786
See application file for complete search history.

(56) References Cited

U.S. PATENT DOCUMENTS

| | | | |
|---|---|---|---|
| 2002/0197735 A1* | 12/2002 | Amirkhanian ... | G01N 27/44721 356/318 |
| 2010/0170799 A1* | 7/2010 | Amirkhanian ... | G01N 27/44721 204/603 |
| 2011/0253540 A1* | 10/2011 | Amirkhanian ......... | G01N 30/74 204/603 |
| 2012/0168312 A1* | 7/2012 | Tsai .................. | G01N 27/44756 204/603 |
| 2014/0200148 A1* | 7/2014 | Slade ............... | G01N 27/44791 506/18 |

OTHER PUBLICATIONS

NY Morgan, E Wellner, T Talbot, PD Smith, TM Phillips, Development of a two-color laser fluorescence detector on-line detection of internal standards and unknowns by capillary electrophoresis within the same sample, Journal of Chromatography A, 1105 (2006) 213-219 (Year: 2006).*

\* cited by examiner

GLYCAN PROFILING UTILIZING CAPILLARY ELECTROPHORESIS

PRIORITY CLAIM

This application is a continuation of U.S. Utility patent application Ser. No. 16/253,159 filed on Jan. 21, 2019, which is a continuation of U.S. Utility patent application Ser. No. 14/720,723 filed on May 22, 2015, which claims the priority of U.S. Provisional Patent Application No. 62/002,142 filed on May 22, 2014. These applications and all documents discussed below are fully incorporated by reference as if fully set forth herein.

BACKGROUND OF THE INVENTION

1. Field of the Invention

The present invention relates to bio-analysis, in particular a method for glycan profiling by capillary electrophoresis and a capillary electrophoresis instrument for performing the method.

2. Description of Related Art

Post-translational modification of proteins with oligosaccharides to form glycoproteins is a common biological motif. These glycoprotein oligosaccharides are involved in a wide range of biological and physiological processes including recognition and regulatory functions, cellular communication, gene expression, cellular immunity, growth, and development. Aberrant glycosylation of proteins is connected to cancer progression, invasion, and metastasis. With many biological functions, glycosylation is one of the most important post-translational modifications of eukaryotic cell proteins.

Oligosaccharides are covalently attached to proteins primarily through two structural motifs. They can be attached to the amide group of an asparagine, referred to as "N-linked glycans" or attached to proteins through the hydroxyl group on serine or threonine, referred to as "O-linked glycans". The biological activity and function of N-linked glycans are well studied as compared to O-linked glycans. However, both types of glycans are investigated as biomarkers in order to understand changes related to complex organelle development, and as part of therapeutic protein drug development, which has increasing evidence that efficacy is effected by glycosylation.

Most glycoproteins exist as a heterogeneous population of glycoforms or glycosylated variants with a single protein backbone and a heterogeneous population of glycans at each glycosylation site. It has been reported in the literature that for some glycoproteins, 100 or more glycoforms exist at each glycosylation site. In view of this heterogeneity and the presence of branched structures, the analysis of glycans is much more complicated than protein chemistry. It requires several different strategies to separate and study the structure of each individual glycan. Once the glycans have been released from the glycoprotein, the glycan pool can be analyzed by MALDI-TOF mass spectrometry (MS) or, after fluorescent labeling, by either HPLC or MS, or both. This strategy can provide a "glycan profile" or a "glycosylation pattern" that is highly characteristic of the glycoprotein. The technology can be applied to compare glycan profiles of glycoproteins found in normal and diseased states, or to compare different batches of recombinant protein products. Both these techniques provide valuable information in terms of composition, linkage and arm specificity (using various exoglycosidases) from which structural information on individual glycans can be elucidated.

Separation of glycans by electrophoresis in polyacrylamide gel has been widely used and different methods are described in the literature for analysis of monosaccharides and oligosaccharides. The most commonly used system is the electrophoresis of fluorophore-labeled glycans in highly cross-linked polyacrylamide gels and is termed as Fluorophore-Assisted Carbohydrate Electrophoresis (FACE). The glycans are usually labeled with a fluorescent tag, mainly ANTS or AMAC and separated on 20-40% gels. The extent of cross-linking means that extra precautions should be taken to prevent heating and warping of the gel during the run. After electrophoresis, the band patterns are visualized by illuminating the gel under UV light and photographing the image. Although this technique is sensitive in the sub-pico molar range, the resolution between the glycans can be poor due to the limitation on the size of the gel.

The slab gel electrophoresis separation method of FACE is based on the use of high concentration polyacrylamide gel electrophoresis to separate intact oligosaccharides released from several glycoproteins. However, slab gel electrophoresis for bio-analysis is labor intensive and needs to be drastically improved in terms of resolving power, throughput and cost per sample.

Recently, a complete method for analysis of N-glycans has been derived from glycoproteins. It is based on a combination of specific chemical and enzymatic conversions coupled with Capillary Electrophoresis (CE) with Laser-Induced Fluorescence (CE/LIF). N-Glycans are released enzymatically from glycoproteins and derivatized with APTS under mild reductive amination conditions to preserve sialic acid and fucose residues. The method successfully profiled the heavily sialylated N-glycans. A method for multistructure sequencing of N-glycans by gel CE and exoglycosidase digestions has also been devised.

Without a doubt, CE with laser-induced fluorescence (LIF) is one of the most powerful analytical tools for rapid, high sensitivity and high-resolution dsDNA analysis and immunoassay analysis applications. However, the current selling price for CE-based LIF systems is much more expensive than traditional slab-gel based bio-analysis systems due to the complicated optical detection mechanism. The expensive CE-based systems are thus out of reach for all but a few well-funded laboratories and seems to be a high-cost barrier. Further, CE is commonly avoided in routine analysis because it is reputed to be a troublesome technique with high failure rates. However this is no longer true because instrument manufacturers have drastically improved instrument design and overall CE knowledge has increased. There are three key factors for reducing failure rate and producing accurate, precise and robust CE data: operator training, system stability, and operation ease of the instrument with low maintenance.

There is a need for a method for glycan profiling by capillary electrophoresis and a capillary electrophoresis instrument for performing the method that reduces costs, with simplicity in operation, and offers rapid analysis with high efficiency, sensitivity and throughput.

SUMMARY OF THE INVENTION

The present invention provides a method for glycan profiling by capillary electrophoresis (CE), and a cost-effective capillary gel-electrophoresis system for highly efficient, high speed, high throughput, glycan analysis (N-Glycan). The novel method and system significantly increase the pace at which glycoprotein research is performed in the laboratory, saving hours of preparation time and assuring accurate, consistent and economical results.

In one aspect of the present invention, a high-performance capillary gel electrophoresis analyzer system has been optimized for glycoprotein analysis application. The system uses integrated dual fiber optic radiation induced fluorescence detection technology (i.e., fibers for both radiation excitation and emission detection). Using commercially available labeling agent such as ANTS as an indicator, the capillary gel electrophoresis-based glycan analyzer (FIG. 1) provides high resolving power within a relatively short run time (e.g., a separation period of 2-5 minutes of separations). The system can hold multiple samples (e.g., a total of 96 samples), which can be automatically analyzed within, e.g., 4-5 hours. This affordable fiber optic based fluorescence detection system can be used in laboratories for high speed glycan profiling applications.

In one embodiment, the glycan analyzer system utilizes relatively short capillary columns (e.g., 15 cm long, 75 µm ID) filled with linear polymer format for the separation of ANTS-labeled complex carbohydrates.

In another embodiment, the analyzer is configured for performing a two-color detection for data analysis (e.g., for accurate data peak identifications). A single radiation excitation source (e.g., LED or Laser) is used to excite two emission fluorophores or dyes in the sample solution to be analyzed. One emission dye is a marker that tags the sample and the other dye is used to provide a reference marker (e.g., a Dextran Ladder) for the sample run. Two detectors (e.g., photomultiplier tubes (PMTs)) are applied to simultaneously detect the fluorescent emissions from the dyes. The data collected by both detectors are correlated (e.g., synchronized, and/or super-positioned for analysis) for accurate data peak identification. The two-color detection simplifies and shortens sample separation and detection into a single run and assures accurate data analysis for peak identification. The dual dye detection (i.e., two dye labeling) is a very robust and accurate way to provide reproducible peak identification and sizing for glycan profiling.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

Figure 1:
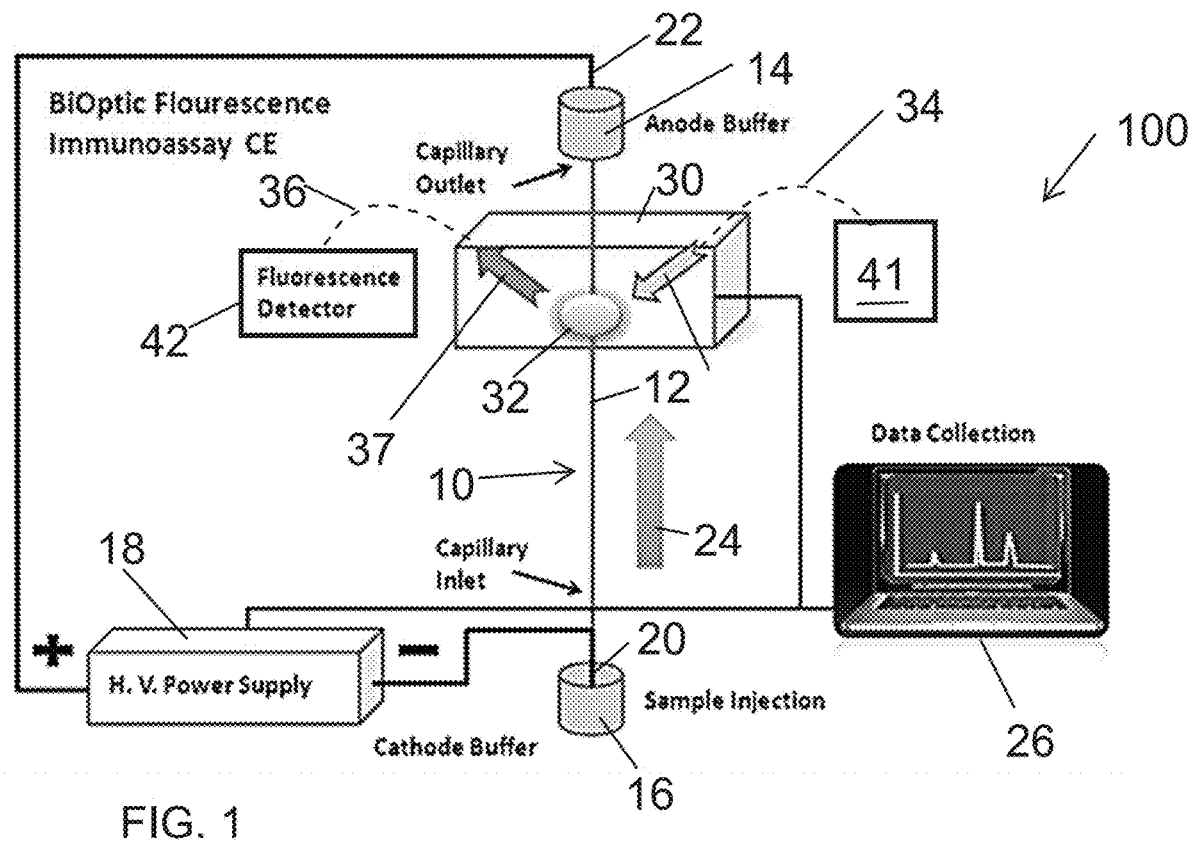
FIG. 1 is a schematic view of a capillary electrophoresis system that incorporates the optical detection configuration in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a method for glycan profiling by capillary electrophoresis (CE), and a cost-effective capillary gel-electrophoresis system for highly efficient, high speed, high throughput, glycan analysis (N-Glycan). The novel method and system significantly increase the pace at which glycoprotein research is performed in the laboratory, saving hours of preparation time and assuring accurate, consistent and economical results.

In one aspect of the present invention, a high-performance capillary gel electrophoresis analyzer system has been optimized for glycoprotein analysis application. The system uses integrated dual fiber optic radiation induced fluorescence detection technology (i.e., fibers for both radiation excitation and emission detection). Using commercially available labeling agent such as ANTS as an indicator, the capillary gel electrophoresis-based glycan analyzer (FIG. 1) provides high resolving power within a relatively short run time (e.g., a separation period of 2-5 minutes of separations). The system can hold multiple samples (e.g., a total of 96 samples), which can be automatically analyzed within, e.g., 4-5 hours. This affordable fiber optic based fluorescence detection system can be used in laboratories for high speed glycan profiling applications.

Reference is made to the bioanalytical system including detection system disclosed in U.S. Pat. Nos. 8,778,155 and 8,784,626, the entirety of which are incorporated by reference as if fully set forth herein. This patent is commonly assigned to BiOptic, Inc., the applicant and assignee of the present invention. In particular, these patents disclosed a simplified, low cost, high efficiency, highly sensitive, high throughput bio-separation system (e.g., capillary electrophoresis (CE) system). The bio-separation system includes an instrument that is configured to work with a capillary cartridge, and that is provided with a detection configuration that includes optics for application of incident radiation at and detection of output radiation from a detection zone along the separation channel, for the detection of radiation emitted by sample analytes (e.g., radiation induced fluorescence emission), without requiring fine alignment of the optics to the separation column. The instrument is configured to conduct bio-separation in the separation channel of the bio-separation cartridge in an automated manner. The CE system has a less complex optical detection mechanism to reduce costs, which complements simplicity in operation, rapid analysis with high efficiency, sensitivity and throughput. The present invention adopts and modifies this system to perform a novel method of glycan profiling, including improvements to the system in accordance with the disclosure hereinbelow.

For purpose of illustrating the principles of the present invention and not limitation, the present invention is described by reference to embodiments directed to capillary electrophoresis using a capillary separation column. Further, the present invention will be described, without limitation, in connection with radiation induced fluorescence detection (e.g., using a laser or LED source). Fluorescence is a spectrophotometric method of analysis where the molecules of the analytes are excited by irradiation at a certain wavelength and emit radiation at a different wavelength. The emission spectrum provides information for both qualitative and quantitative analysis. Generally, the advantage of fluorescence detection over absorbance detection is the superior detectability (detection sensitivity). For efficient fluorophores, single molecule detection in small volumes has been demonstrated. This is in part because fluorescence signal is measured against a relatively dark background, as a result of the emitted radiation being detected at a wavelength that is different from the wavelength of the incident radiation (e.g., the wavelength of the emitted fluorescence is at longer wavelengths than the excitation radiation).

Referring to FIG. 1, a capillary electrophoresis (CE) system 100 incorporates the detection configuration as schematically illustrated. The CE system 100 generally comprises a capillary separation column 10 (e.g., 200-500 μm O.D.), which defines an internal separation channel 12 (e.g., 25-150 μm I.D.). The capillary column 10 may be made of fused silica, glass, polyimide, or other ceramic/glassy materials. The inside walls of the separation column 10 (i.e., the walls defining the separation channel 12) may be coated with a material that can build up an electrostatic charge to facilitate electrophoresis and/or electrokinetic migration of the sample components. The separation channel 12 may be filled with a separation support medium, which may be simply a running buffer, or a sieving gel matrix (of a linear or non-linear polymeric composition) known in the art.

One end of the capillary column 10 is coupled to a reservoir 14 of running buffer. The other end of the capillary column 10 is coupled to another reservoir 16, which may alternately contain a sample (to be injected into the separation channel 12) and running buffer (after sample injection, to undertake separation). A power supply 18 supplies a high voltage to the reservoirs 14 and 16 via electrodes 20 and 22.

The mechanism of electrophoresis and radiation induced fluorescence when considered alone are outside the scope of the present invention. For the sake of completeness, it is sufficient to briefly mention the operation of the CE system 100. In operation, a prepared biological sample, tagged with at least one known fluorophore, is introduced into the far end of the capillary column away from the detection zone, by any of a number of ways that is not part of the present invention (e.g., electrokinetic injection from a sample reservoir or physical pressure injection using a syringe pump). When a DC potential (e.g., 1-30 KV) is applied by the power supply 18 to the electrodes 20 and 22, the sample migrates under the applied electric potential along the separation channel 12 in the direction 24 (e.g., sample that is negatively charged travels toward the positive electrode 22 as shown in FIG. 1) and separates into bands of sample components. The extent of separation and distance moved along the separation channel 12 depends on a number of factors, such as migration mobility of the sample components, the mass and size or length of the sample components, and the separation support medium. The driving forces in the separation channel 12 for the separation of samples could be electrophoretic, pressure, or electro-osmotic flow (EOF) means.

When the sample reaches the detection zone 32, excitation radiation is directed via the excitation fiber 34 in a direction 35 at the detection zone 32. The sample components would fluoresce with intensities proportional to the concentrations of the respective sample components (proportional to the amount of fluorescent tag material). The detector 42 detects the intensities of the emitted fluorescence via the emission fiber 36 in a direction 37, at one or more wavelengths different from that of the incident radiation. The detected emitted radiation may be analyzed by known methods, as well as further methods discussed below (e.g., in connection with the two-color detection scheme discussed in reference to FIGS. 14 and 15 below). For an automated system, a controller 26 (e.g., in the form of a notebook computer or a desktop computer) having a processor, controls the operations of the various components in the CE system 100 to effect capillary electrophoresis separation and data collection. Such control is well within the knowledge of one skilled in the art.

Figure 2:
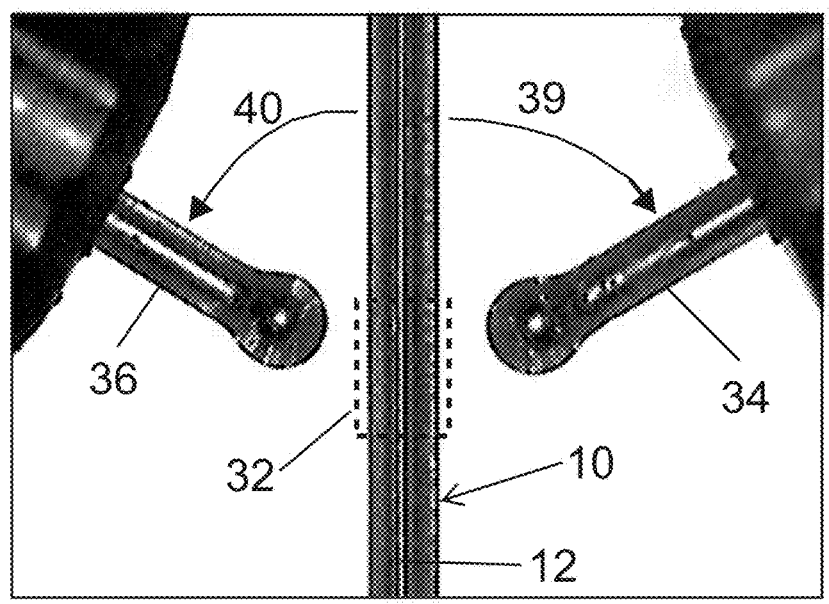
FIG. 2 illustrates the detection region, showing the configuration of the excitation fiber, emission fiber and the capillary column.

In the particular illustrated embodiment in FIG. 1, the detection optics configuration (schematically indicated in the area 30 located about a detection window/zone 32) corresponds to the embodiment illustrated in FIG. 2. The direction 35 of incident radiation (e.g., from a laser or LED source), the axis of the separation channel at the detection zone, and the direction 37 of collection of the output radiation are all substantially in the same plane. In the illustrated embodiment, the detection configuration of the present invention has optical fibers positioned at opposite sides of the detection zone separation channel. In one embodiment, the incident radiation is provided to the detection zone and/or the output radiation is collected from the detection zone, using light guides in the form of optical fibers, in particular ball-ended optical fibers (i.e., optical fibers terminating in a micro ball that is integral to the fiber end in a unitary structure).

Referring also to FIG. 2, a ball-ended fiber (the excitation fiber 34) extends from a radiation source (e.g., LED or laser source 41, schematically shown in FIG. 1) to direct excitation radiation in a direction 35 at the detection zone 32. The ball end of the excitation fiber 34 is positioned at or proximate to the exterior surface of the separation column 10 about the detection zone 32. In the illustrated embodiment, the ball end of the excitation fiber 34 is positioned at a distance spaced from the exterior surface of the separation column 10 (i.e., non-contact mode). In this illustrated embodiment, another ball-ended fiber (the emission fiber 36) extends to a detector (e.g., a fluorescence detector 42, schematically shown in FIG. 1) to collect emitted radiation at a direction 37 from the detection zone 32. The ball end of the emission fiber 36 is positioned at or approximate to the exterior surface of the separation column 10 about the detection zone 32. In the illustrated embodiment, the ball end of the emission fiber 36 is positioned at a distance spaced (in a non-contact mode) from the exterior surface of the separation column 10. Both excitation and emission fibers 34 and 36 with ball tips are positioned at opposite sides of the separation column 10 in a non-contact mode (spaced from the exterior of the capillary column) to reduce background fluorescence and not cause any physical damage to either capillary column or the micro-ball.

In the illustrated embodiment in FIG. 2, the components at the detection zone 32 as shown in FIG. 2 lie in substantially the same plane. Specifically, the longitudinal axis of the excitation fiber 34, the longitudinal axis of the emission fiber 36 and the longitudinal axis of the capillary channel 12, are substantially aligned in the same plane (i.e., substantially coplanar), at least at the region of the detection zone 32. That is, while the lengths of the excitation fiber 34, the emission fiber 36 and the capillary column 10 may be bent overall, however at least near the detection zone region, the axis of the excitation fiber 34, the axis of the emission fiber 36 and the axis of the capillary channel 12 are substantially aligned in the same plane, such that the direction 35 of incident radiation from the excitation fiber 34 towards the detection zone 32, the axis of the separation channel 12 at the detection zone 32, and the direction 37 of collection of the output radiation away from the detection zone along the emission fiber 36 are all substantially in the same plane.

Further, at the detection zone 32, the angle between the axis of the excitation fiber 34 and the axis of the emission fiber 36 are not aligned in a straight line. At least one of the axis of the excitation fiber 34 and the axis of the emission fiber 36 is not perpendicular to the axis of the separation channel 12 at the detection zone 32. In the illustrated embodiment shown in FIG. 2, both the axis of the excitation fiber 34 and the axis of the emission fiber 36 are not perpendicular to the axis of the separation channel, and are at angles 39 and 40, respectively, to the axis of the separation channel 12 at the detection zone 32. The angle 39 and the angle 40 may be substantially the same or different, and may be less than or greater than 90 degrees measured with respect to a reference direction of the axis of the separation channel 12 or a reference section of the capillary column 10 (e.g., the section of capillary column 10 between the fibers 34 and 36 as shown in FIG. 2). For example, the angle 39 may be less than 90 degrees and the angle 40 may be greater than 90 degrees, measured from the same reference section. In the illustrated embodiment in FIG. 2, the angles 39 and 40 are same and substantially in the same plane.

In the embodiment illustrated in FIG. 2, both the excitation fiber 34 and the emission fiber 36 each has a 200 micron diameter core as light guide within an external cladding, and a 350 micron diameter ball shaped tip (i.e., the ratio of the fiber core diameter to the ball diameter is 1:1.75), which comprises fused the core and cladding material. The ball shaped tip has a substantially spherical profile. The ball-end fibers may be formed by using a fusion splicer, or are available from a number of available suppliers. The capillary column 10 has an outside diameter of 200 to 370 micron (e.g., 360 micron) and an internal diameter of 20 to 150 micron (e.g., 75 micron). The tip of the ball end of the excitation fiber 34 is spaced at approximately 50-500 micron from the external surface of the capillary column, and the tip of the ball end of the emission fiber 36 is spaced at approximately 10 to 500 microns (e.g., 50-200 micron) from the external surface of the capillary column. Alternatively, the emission fiber 36 may have a 300 micron diameter core with a 500 micron diameter ball shaped tip at its distal end (i.e., the ratio of the fiber core diameter to the ball diameter is 1:2.5). The angles 39 and 40 each may range from greater than 0 to less than 90 degrees, preferably between 20 to 70 degrees, and more preferably at 30 to 45 degrees. In the illustrated embodiment of FIG. 2, both angles 39 and 40 are about 70 degrees. The ball ends of the fibers 34 and 36 are not touching the capillary column 10.

In one embodiment, the optical detection system is structured with a super-bright UV LED (e.g., LG Innotek/IR-Tronix or Dowa) as excitation radiation source for the fluorescent labeled (FITC) antibody fragment detection. The modular design and fiber optic coupling provides flexibility for exchanging the excitation radiation to a laser module (for LIF applications) or other type of inexpensive light sources.

It has been found that compared with flat-end fibers (bare fiber, with no micro ball lens), the ball-ended fibers provide good focusing of incident radiation (light concentration/power density) for the excitation fiber 34 and high collection efficiency (high Numerical Aperture; NA) for the emission fiber 36 as a high angle fluorescence collector for increased fluorescence signal collection capability and improved detection sensitivity. Using large core (e.g., 100-1000 micron) and high NA (0.15-0.5) multi-mode fibers, it allows high power light coupling from LED or laser into the excitation fiber 34. By producing an integrated micro ball lens at the distal output end of the excitation fiber 34, it allows good coupling efficiency inside the separation channel 12 (e.g., 20-200 micron micro-fluidic channel) for high fluorescence detection sensitivity.

A smaller diameter excitation fiber 34 having 200 micron core diameter with a 330-350 micron diameter ball (see FIG. 2) directed at the capillary separation channel 12 results in a smaller focal spot with higher power density, thereby optimizing the fluorescence excitation signal. If an emission fiber 36 having a 300 micron core diameter and a 500 micron diameter ball lens is used for emission collection, the emission collection efficiency is increased. The outside diameter of the capillary column is 360 micron, and the inside diameter is 75 micron.

Figure 5:
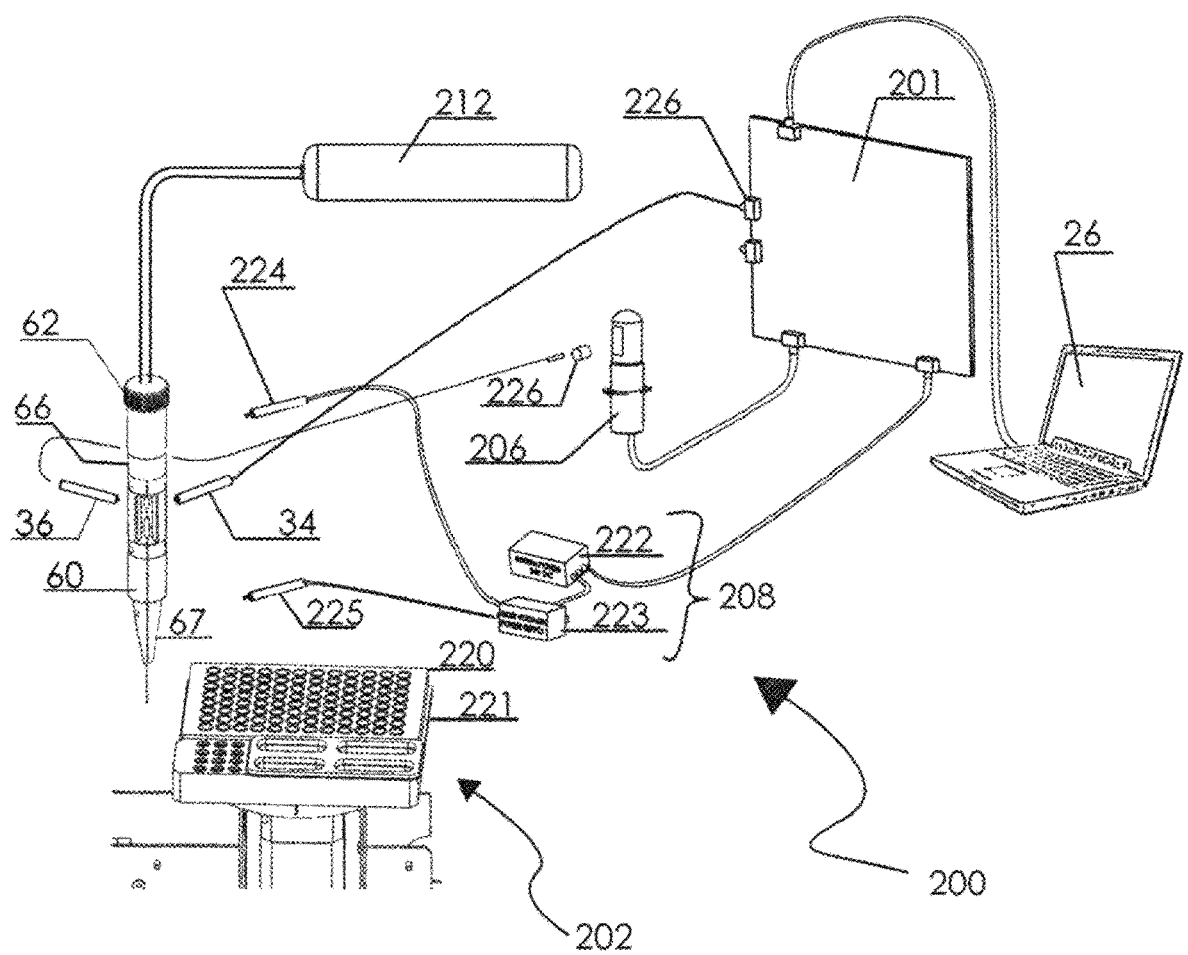
FIG. 5 is a schematic view illustrating the components of the CE instrument of FIGS. 3 and 4, in accordance with one embodiment of the present invention.

The excitation and emission fibers could be pre-positioned fixed within the body/assembly of a capillary cartridge (see cartridge 60 shown in FIG. 5; which may include a separation support medium such as a gel). The 2-fiber detection configuration with ball-end fibers has been applied to a disposable single-channel, single capillary cartridge concept with an integrated buffer reservoir. A higher throughput instrument utilizing 4 or 8 gel-cartridges (of the same design) could be designed to speed up the separation time (cycle) by a factor of 4×-8× (1 hour for full 96-well sample plate run).

The test samples are introduced to the separation capillary column 10 by electro kinetic injection. The high voltage power supply (e.g., EMCO, Sutter Creek, CA) is used to deliver, e.g., 500V to 20 KV of electrical field to the capillary for the electro kinetic injection and separations of bio-molecules. An excitation LED having broad band light energy (e.g., FWHM=20-50 nm) and 20-100 degrees of viewing angle is coupled to the large core excitation fiber (e.g., 100-1000 micron) at the flat end (polished or cleaved end). A line filter (e.g., FWHM=2-50 nm Band Pass line filter) is placed in front of the LED before coupling the light into the 200 micron diameter core with 350 diameter micron ball-ended excitation fiber to reduce background noise. The micro-ball lens end of the fiber is produced by fusion splicing (high voltage heat melting) with a well controlled ball diameter to create a well defined exit NA and spot size for coupling the excitation radiation energy into the inner diameter (the separation channel) of the capillary column. The fluorescence emission signal produced by the separated analytes are then collected at the detection zone of the capillary channel using a similar ball-ended fiber (larger core fiber with 500 micron diameter ball) and is relayed to an external detector module (e.g., fluorescence detector 42 schematically shown in FIG. 1), which may include one or more photomultiplier tubes (PMTs) or SiPMTs or CCDs, and may also include beam-splitters, built-in emission filters (e.g., Band Pass Filters) for glycan profiling, in accordance with further disclosure below.

Figure 3:
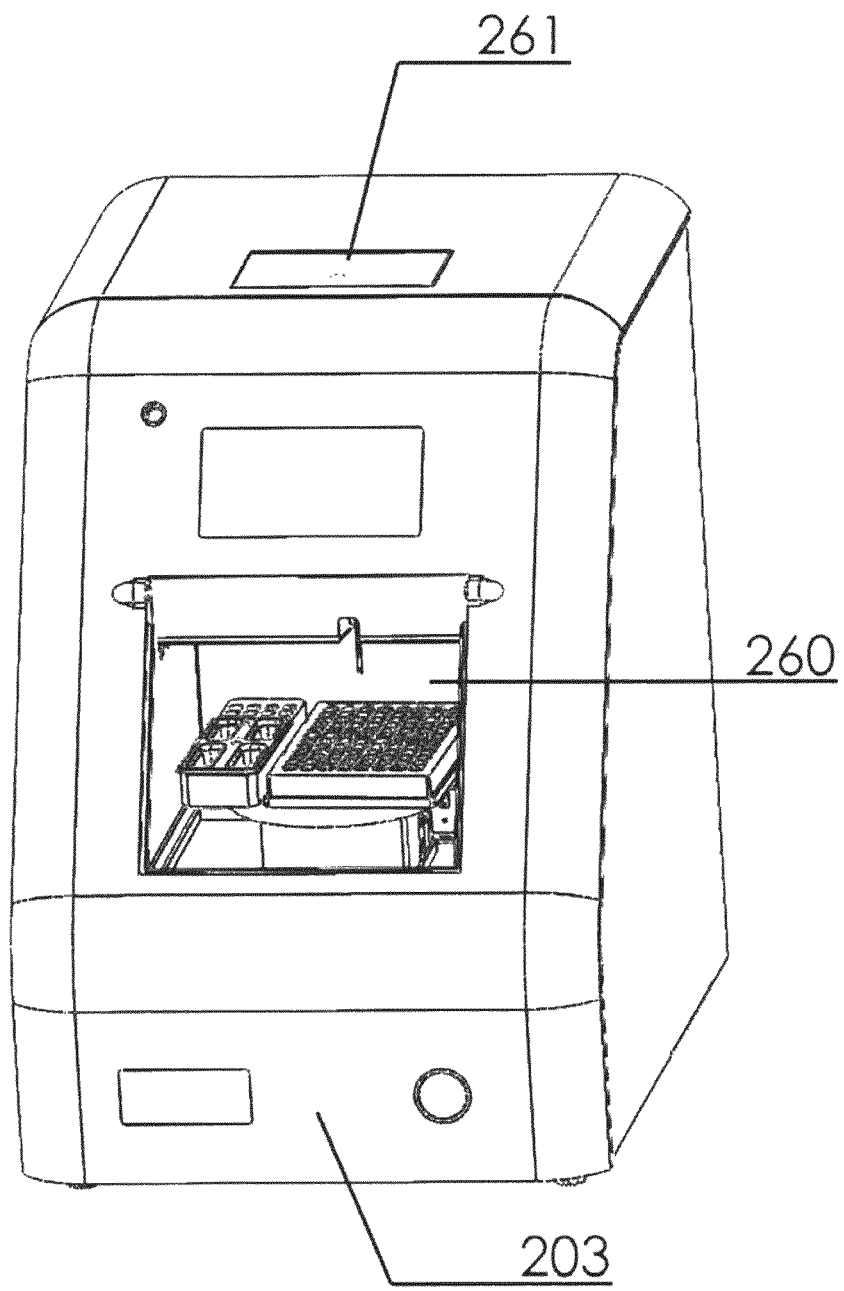
FIG. 3 illustrates the external view of a CE instrument, in accordance with one embodiment of the present invention.
Figure 4:
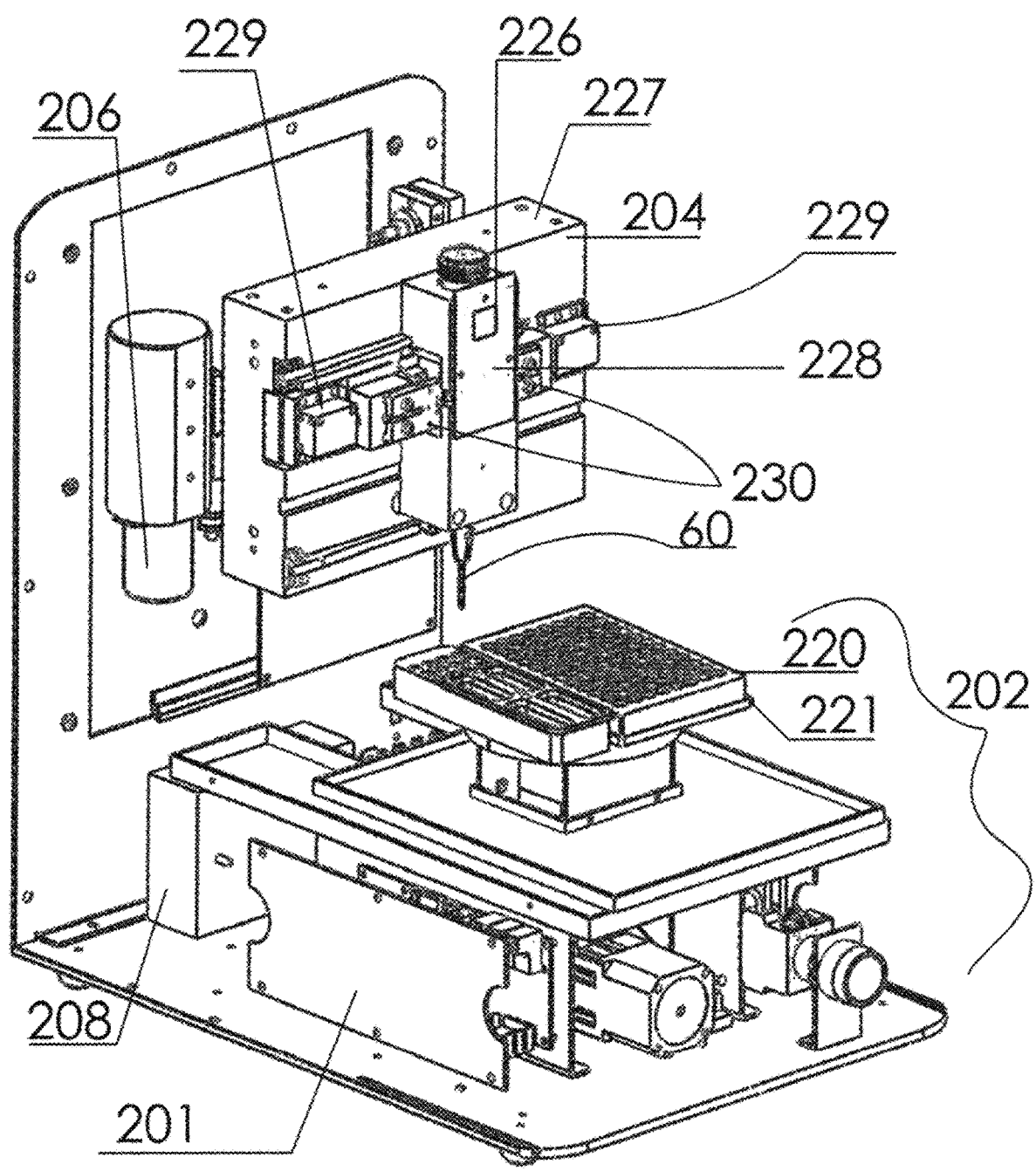
FIG. 4 illustrates the internal view of the CE instrument of FIG. 4, in accordance with one embodiment of the present invention.

FIG. 3 illustrates the external view of a CE instrument 200 in accordance with one embodiment of the present invention. The CE instrument 200 includes essential components including the detection configuration schematically shown in FIG. 1. FIG. 4 illustrates that internal view of the CE instrument 200 with the front and side housing 203 removed, in accordance with one embodiment of the present invention. FIG. 5 is a schematic view illustrating the components of the CE instrument 200, some of which reside within the instrument housing, and some outside of the housing. The CE instrument 200 comprises a system board 201, operatively coupled to a sample transport mechanism 202, a cartridge interface mechanism 204, an optical signal detector such as a photomultiplier tube (PMT) 206, a power supply 208 (which includes a high voltage power supply 223, and may further include a system power supply 222; the power supply 222 may reside outside of the CE instrument 200), detection optics (e.g., as shown in FIG. 2), and a pressurized gas source 212 (which may reside outside the CE instrument 200, but connected to a port in the instrument housing).

A controller 26 is provided for user interface and programming of experiment/test settings and parameters. The controller includes the necessary application software routines, which may also include data reduction applications. The controller 26 may be an integral part of the instrument 200 (e.g., as part of the system board 201, with application routines coded in ASICs), or it may be a separate unit coupled/interfaced to the CE instrument 200. In the illustrated embodiment, the controller is external to the housing of the CE instrument 200, in the form of a desktop computer or notebook computer, which is coupled to the CE instrument 200 via the system board 201 via a USB interface. The external controller 26 may include mass storage devices, display, keyboard, etc., or some of these user interface components may be configured integral to the CE instrument (e.g., a display and a keyboard on the front housing). Alternatively, the system board 201 may be incorporated as part of the external controller 26, without departing from the scope and spirit of the present invention.

The system board 201 includes the necessary electronics to drive the various components in the CE instrument, e.g., the movements of the transport mechanism 202, the output of the power supply 208, the PMT 206, the valve release of the pressurized gas 212, the movements of the cartridge interface 204, an RFID transmitter/reader, etc. It is noted that the system board 201 is schematically represented in the figures. It may include other electronic boards for controlling specific components (e.g., electronic board for controlling motors in the sample transport mechanism 202), or these other boards may be separate from and in communication with the system board 201 to perform the intended function. The exact electronic board configuration is not critical to the present invention, and it is well within the knowledge of one skill in the art to configure the boards to achieve the desired functions and features disclosed herein.

The sample transport mechanism 202 includes a table 221 supporting a sample and buffer tray 220 having multiple wells (e.g., a standard 96-well titer plate, and larger wells for buffer, cleaning solutions and waste collection) to move with three degrees of freedom. The multiple wells may include wells containing cleaning solutions and samples and also for waste collection. It is noted that in the figures, X, Y and Z are orthogonal axes. Y is the vertical axis; X is in a horizontal direction across the instrument (parallel to the rear of the instrument); and Z is in a horizontal direction into and out of the instrument. The table 221 is controlled by the transport mechanism 202 to move up and down, and to move within a plane in a straight line and rotate within the plane. That is, the table 221 moves in a single horizontal direction (Z-direction), and in a vertical (Y-direction), and rotation about the vertical axis (Y-axis). The combination of rotation and translation motions would be able to place any of the multiple wells in the tray 220 for access by the tip of the depending capillary column 60. The front panel 203 of the instrument housing includes an opening with a door 260 to allow user access to place and remove the tray 220.

The pressurized gas source 212 (e.g., pressurized air or N2) may be a gas cartridge installed within the housing of the CE instrument, or may be an external source (e.g., air-pump) providing pressurized gas to the CE instrument via a gas connection port at the instrument housing (in which case, the pressurized gas source would be the gas connection port to the external gas source). The pressured gas is fed to the reservoir 62 in the cartridge 60 via appropriate gas tubing and valves (which is operatively coupled to the system board 201).

The power supply 208 includes a system DC power supply 222 (e.g., 12-24 VDC from external AC power) coupled to the system board 201, and a variable high voltage power supply 223 providing the necessary high voltage to electrode contacts/probes 224 and 225, for electrical contact with electrodes 66 and 67 in the cartridge 60 for carrying out electrophoresis therein. Alternatively, instead of using an internal 12-24 VDC power supply with external AC power, the CE instrument 200 may use an external 12-24 VDC power supply, which makes the instrument simpler and safer to use without the internal AC to DC conversion. This would also allow for battery operation for field portability and operations. The contact probes 224 and 225 may be actuated pneumatically (e.g., by regulating pressurized gas from the gas source 212, or electromechanically, to contact against the exposed surfaces of the electrodes 66 and 67, or the contact probes 224 and 225 may be simply spring loaded to bias against the exposed surfaces of the electrodes 66 and 67.

The excitation fiber 34 is optically coupled to a light source in the form of an LED 226, which may be part of the system board 201. The emission fiber 36 is optically coupled to the PMT 206 via appropriate optical filters 226. The electrical output of the PMT 206 is coupled to the system board 201.

The cartridge interface mechanism 204 is supported on the chassis of the instrument, and is configured to receive the cartridge 60, and support its location positively and accurately with respect to the detection optics. A cartridge-door 261 (FIG. 3) is provided at the top panel of the instrument housing. The cartridge interface mechanism 204 includes a base 227 supporting a receiver block 228 having a cylindrical opening sized and configured to receive the cartridge 60 as shown. In this illustrated embodiment, the cartridge 60 is support by the receiver block 228 in a vertical orientation, with its longitudinal axis substantially vertical with respect to the horizontal plane of the tray 220. It is within the scope of the present invention to have the cartridge supported with its longitudinal axis horizontal with respect to reagent/sample containers. A safety interlocking feature may be provided to engage to prevent the cartridge 60 from being accidentally removed from the receiver block 228 during electrophoresis operations. The safety interlock feature could also include the front door (sample-door) 260 for tray 220 and top door (cartridge-door) 261 for insertion of the cartridge 60 (FIG. 3), to prevent user accidentally opening these doors during electrophoresis operations. The safety interlock (not shown) will only be released upon execution of termination sequence for an electrophoresis run (e.g., shutting down high voltage supply, and outward movement of the fork assemblies 230 described below). The receiver block 228 also includes an RFID reader/transmitter 226 (e.g., on the outside of the receiver block 228) for communicating with an RFID label on the capillary cartridge 60.

In one embodiment of the present invention, the aforementioned CE instrument/system is adopted and modified and improved for glycan profiling. In one embodiment, the glycan analyzer system utilizes relatively short capillary columns (e.g., 15 cm long, 75 µm ID) filled with linear polymer format for the separation of Instant Dye-labeled or ANTS-labeled complex carbohydrates.

Miniaturization and automation of the CE has many advantages over conventional labor intensive techniques (i.e. slab-gel electrophoresis) for glycan profiling. These advantages include improved data precision and reproducibility, short analysis times, minimal sample consumption, improved automation and integration of complex workflows. In particular, the CE system provides automated sample analysis of Instant Dye-labeled or ANTS-labeled N-glycans by the use of disposable gel capillary cartridge (e.g., cartridge 60 discussed above). The fluorescence detector in the CE system includes UV LED (e.g., 270 nm-380 nm) as the excitation source and the emission Detection uses a PMT (e.g., Hamamatsu R5984) with a band-pass filter (e.g., 400 nm-550 nm). The fluorescence detection is done by two optical fibers (i.e., one fiber IN and one fiber OUT). After the cartridge is installed inside the instrument (FIG. 4), the Instant Dye-labeled or ANTS-labeled Glycan samples are injected from the sample tray (FIGS. 4 and 5) into the capillary column for separation and detection.

Specifically, an example, but not limitation, of the protocol for glycan profiling includes a single micro-fluidic glass capillary (75 µm ID) with an effective separation length of 11 cm supported in a capillary cartridge (e.g., cartridge 60 disclosed above). The shortened capillary length allows for reduced operating voltages (4-8 KV) and the elimination of expensive cooling systems such as Peltier or recirculating chillers. The cartridge includes top and bottom electrodes (anode & cathode), an exposed detection zone and an imbedded RFID chip/label to provide ID for the gel-cartridge type and track the number of runs per cartridge. Each cartridge contains linear gel-matrix and is capable of analyzing 100-300 (typically 200) samples in as few as 2 minutes per sample, consuming as little as 1 pl from the 1 µl-20 µl sample volume.

The system operations are as follows. Buffer(s), markers and samples are placed in the buffer/sample tray on the platform within the CE instrument (e.g., CE instrument 200 in FIGS. 3-5) and the capillary gel cartridge is inserted. Using the system software (including user interface), the user selects their preferred preprogrammed method or programs new run parameters followed by indicating the location of the samples to be tested and the analysis is started. Depending on the selected methods associated with the gel-cartridge type the results are completed and displayed within 2-5 minutes. For example, the Q-Analyzer™ software (developed by BiOptic, Inc.) automatically identifies and calculates the glucose units (gu) of detected glycan peaks using a reference glycan Ladder table.

Using the CE system described above to perform glycan profiling, it has been found that the present invention provides a cost-effective capillary gel-electrophoresis system for highly efficient, high speed, high throughput, glycan analysis (N-Glycan). The novel method and system significantly increase the pace at which glycoprotein research is performed in the laboratory, saving hours of preparation time and assuring accurate, consistent and economical results.

Figure 10:
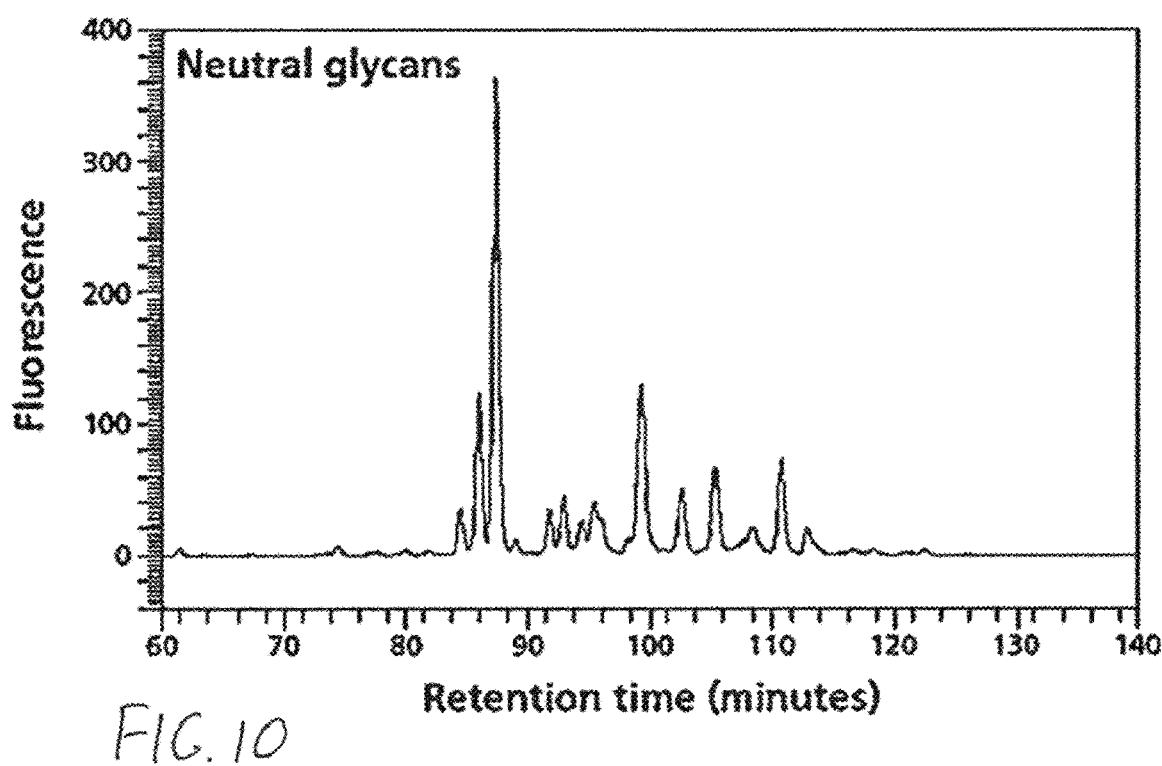
Figure 11:
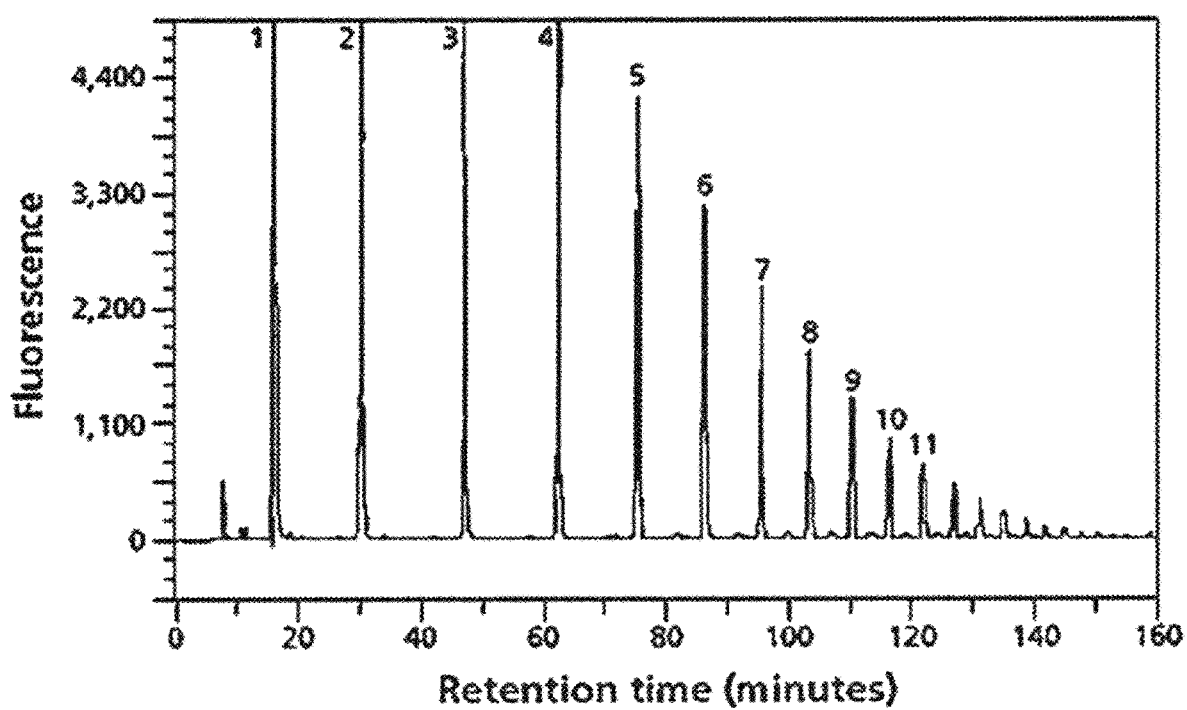
Figure 12:
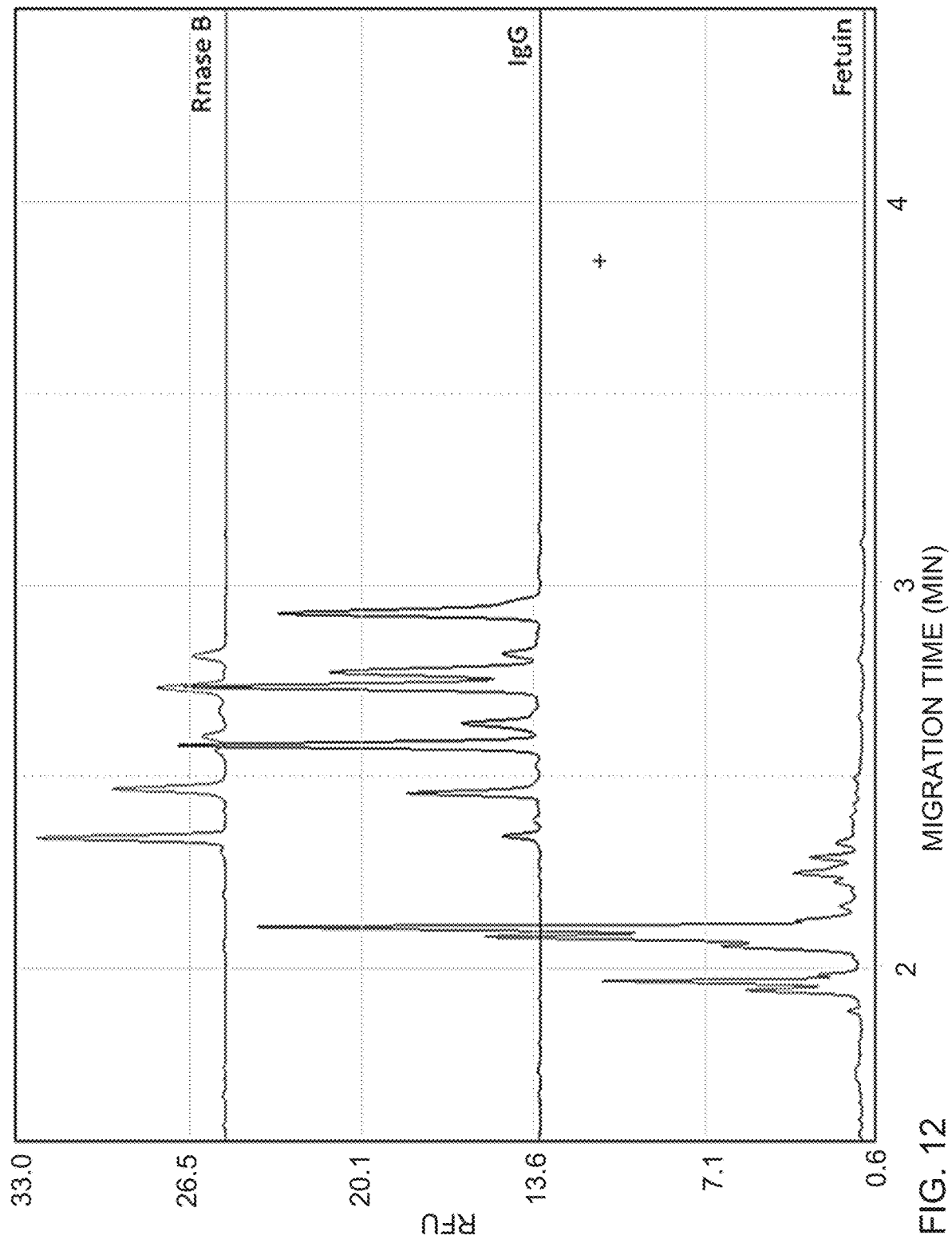
FIGS. 12-13 illustrate results of fluorescence detection of glycan profiling by the inventive CE instrument and method in accordance with the present invention.
Figure 13:
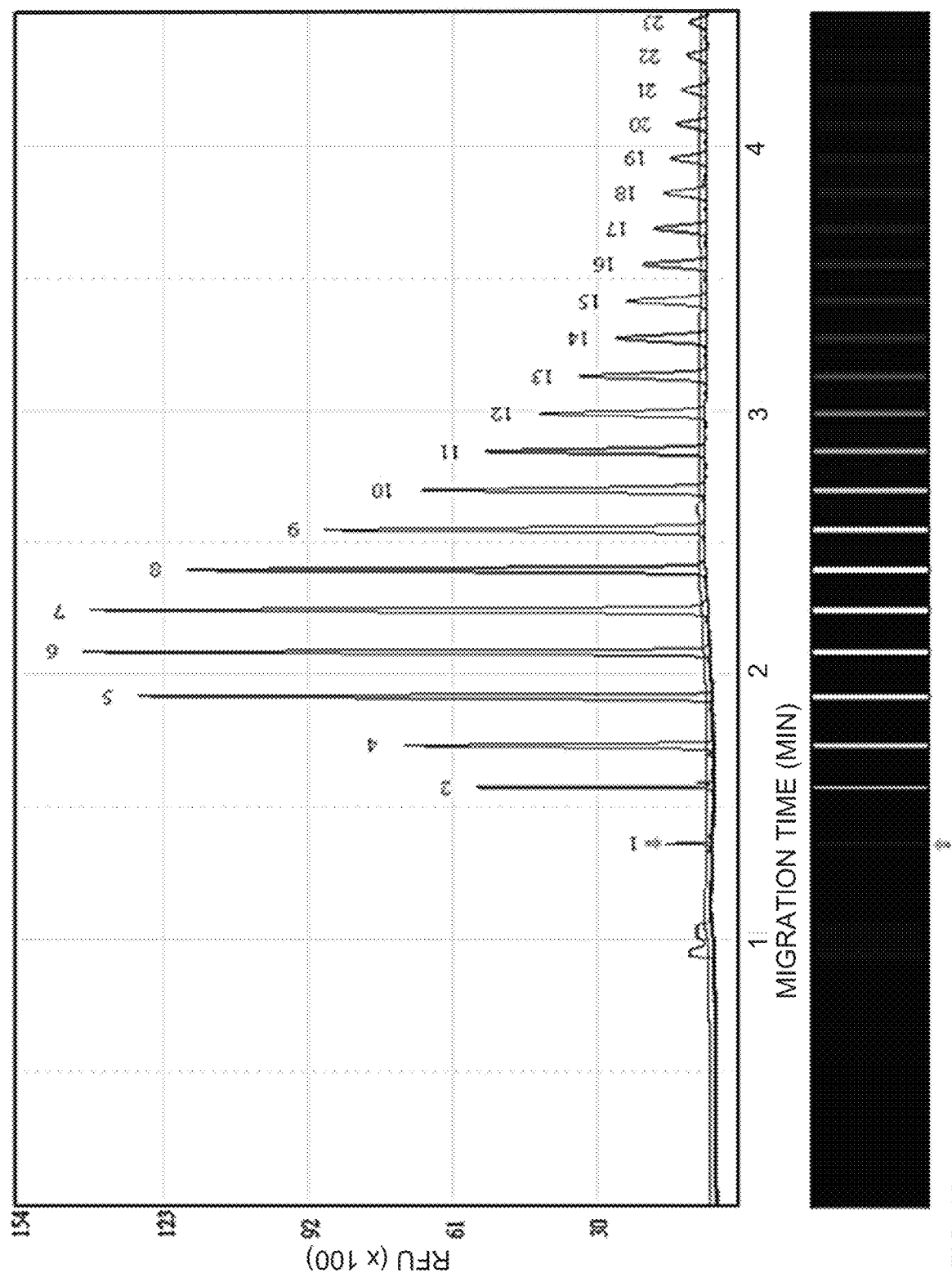

FIGS. 8-11 are results of detected fluorescence in connection with glycan profiling using traditional HPLC, and FIGS. 12-13 are results of detected fluorescence in connection with glycan profiling using the inventive system 200 and associated method described above.

Figure 8:
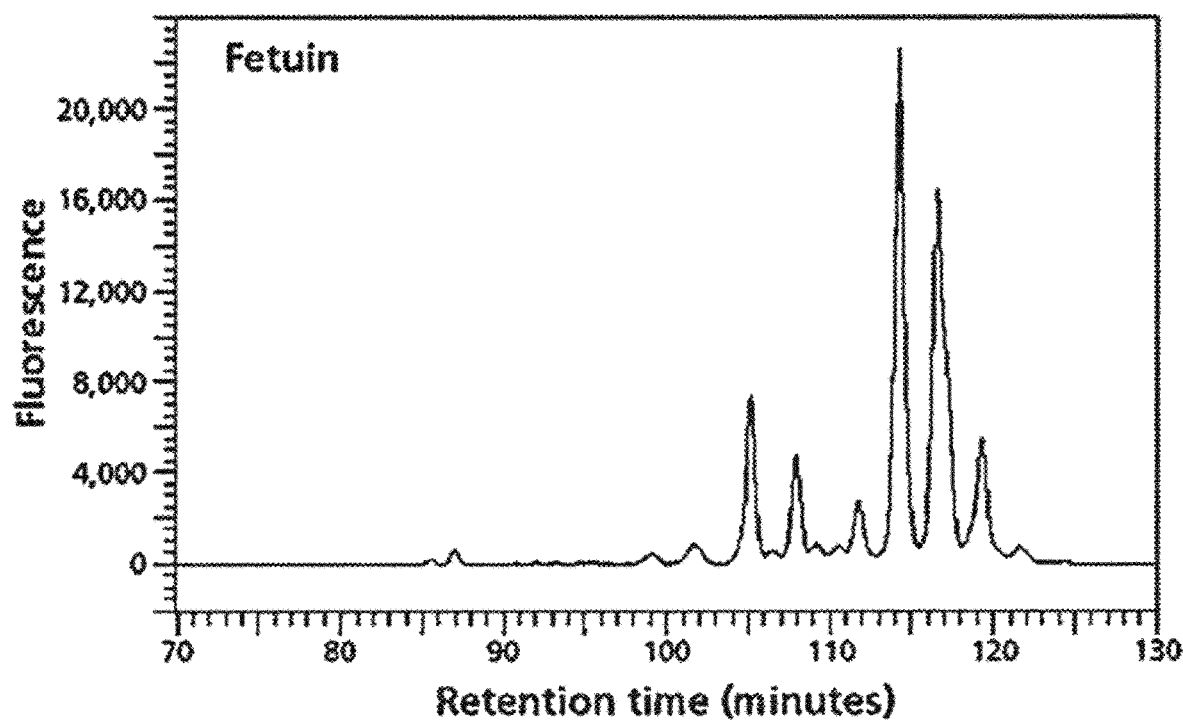
FIGS. 8-11 illustrate results of fluorescence detection of glycan profiling by HPLC.
Figure 9:
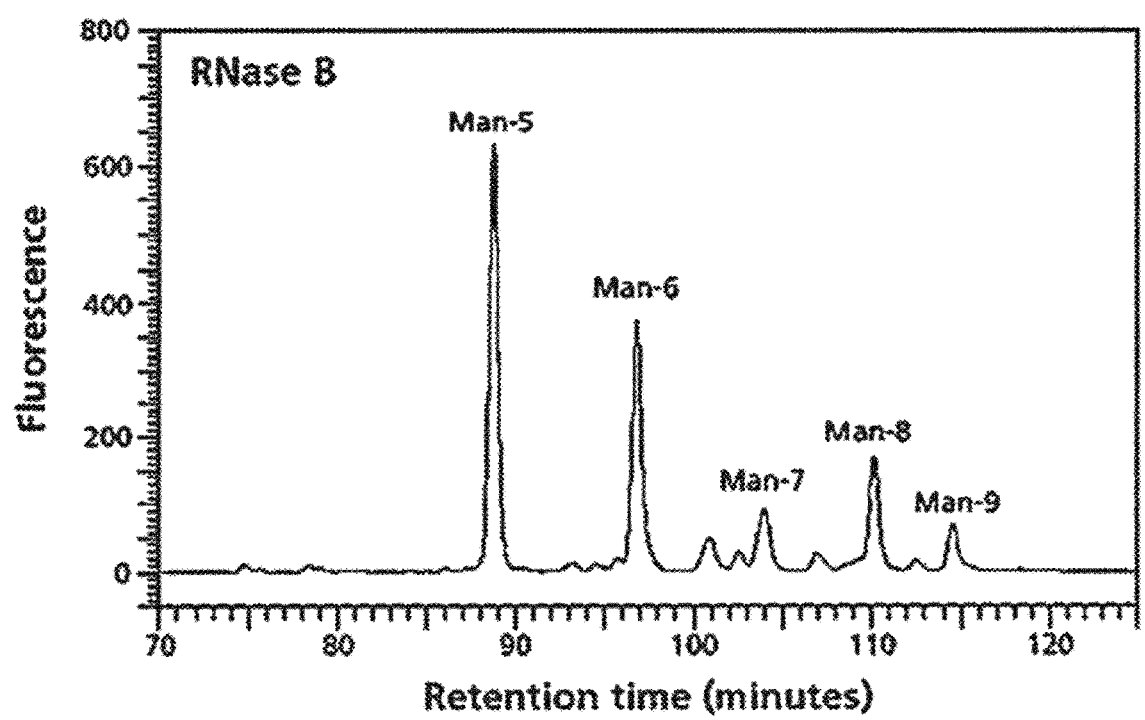

Specifically, FIG. 8 illustrates the detected fluorescence for HPLC profile of the 2-AB labeled N-linked glycan library obtained from Fetuin, requiring a run time of 130 minutes; FIG. 9 illustrates the detected fluorescence for HPLC Profile of the 2-AB labeled N-linked glycan library obtained from RNase B, requiring a run time of 130 minutes; FIG. 10 illustrates the detected fluorescence for separation of the neutral glycan fraction from by normal phase chromatography, requiring a run time of 140 minutes; and FIG. 11 illustrates the detected fluorescence for separation of partially hydrolyzed 2-AB labeled dextran on normal phase HPLC; requiring a run time of 160 minutes. The numbers at the peaks of the profile indicate glucose units (gu).

FIG. 12 illustrates the detected fluorescence for profile of ANTS labeled N-linked glycan library obtained from Fetuin, IgG and Rnase B utilizing the novel CE system 200, requiring run time of less than 5 minutes. FIG. 13 illustrates the detected fluorescence for separation of ANTS labeled dextran utilizing the novel CE system 200, requiring a run time of 5 minutes. The numbers at the peaks of the profile indicate glucose units (gu). The Dextran Ladder is used as a reference marker for accurate peak identification.

Comparing the results of traditional HPLC profiling (FIGS. 8-11) of glycan samples are compared with the results of similar profiling using the inventive system 200 and associated method (FIGS. 12-13), it can be clearly realized that the HPLC method of profiling glycan took more than 2 hours (FIGS. 8-11), as compared to the significantly shorter run time of less than 5 minutes for the inventive system 200 (FIG. 12).

Instead of running the sample and a reference marker in separate runs, and detecting using a single wavelength detection for each run, the CE system is configured with an improved detection scheme requiring dual-color/wavelength detection. In another embodiment, the analyzer is configured for performing a two-color detection for data analysis (e.g., for accurate data peak identifications). A single radiation excitation source (e.g., LED or Laser) is used to excite two emission fluorophores or dyes (e.g., UV-type fluorophores) in the sample solution to be analyzed. One emission dye is to tag the sample and the other dye is used to provide a reference marker (e.g., a Dextran Ladder) in the same sample run. Two detectors (e.g., photomultiplier tubes (PMTs)) are applied to simultaneously detect the fluorescent emissions from the dyes. The data collected by both detectors are correlated (e.g., synchronized, and/or super-positioned for analysis) for accurate data peak identification. The two-color detection simplifies and shortens sample separation and detection into a single run and assures accurate data analysis for peak identification. The dual dye detection (i.e., two dye labeling) is a very robust and accurate way to provide reproducible peak identification and sizing for glycan profiling.

Referring back to FIGS. 1 and 2, in this improved CE detection scheme, a single detection/emission fiber 36 captures the fluorescence emission from the detection zone 32 similar to the prior embodiment discussed above (i.e., one fiber IN/one fiber OUT). However, from the single emission fiber 36, the fluorescence emission is detected in at least two different wavelengths, by "splitting" the fluorescence emission into at least two signals for detection at two different wavelengths (e.g., at λ1 and λ2 in FIG. 6). In this embodiment, the fluorescence detector 42 in FIG. 1 includes at least two corresponding detectors for at least two wavelengths of fluorescence emissions. For example, the excitation wavelength may be 270-380 nm and emission detection wavelength of 400-550 nm for the Instant Dye-labeled or ANTS-labeled fluorophores as glycan labeling.

There are at least two approaches to splitting the fluorescence emission for detection at different wavelengths.

Figure 6:
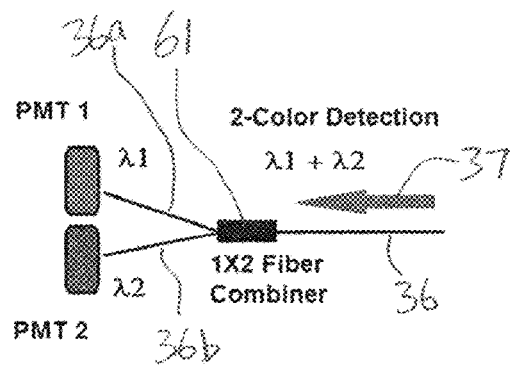
FIG. 6 schematically illustrates a two-color detection scheme in accordance with a first embodiment of the present invention.

FIG. 6 illustrates one embodiment of two-color detection, including a fiber combiner/splitter 61 for splitting an emission signal 37 into two signals for fluorescence detection at two different wavelengths. The 1×2 fiber combiner/splitter 61 couples the output signal 37 of the emission fiber 36 to the inputs of a first emission fiber 36a and a second emission fiber 36b. The emission fiber 36 includes fluorescence at at least two wavelengths λ1 and λ2. In this embodiment, λ1 corresponds to the wavelength of the fluorescence of detected Dextran Ladder and λ2 corresponds to the wavelength of the fluorescence of detected glycan profile. The first emission fiber 36a routes emissions from the emission fiber 36 to a first PMT1 that detects fluorescence at λ1, and the second emission fiber 36b routes emissions from the emission fiber 36 to a second PMT2 that detects fluorescence at λ2. The fiber combiner may be of the type that splits orthogonal polarizations at at least two wavelengths (e.g., at λ1 and λ2) or two ranges of wavelengths (e.g., Thorlabs 1×2 Coupler or Gould 1×2 Fiber Splitter). In addition, while not shown in FIG. 6, one or more band-pass filters may be provided between the PMT1 and/or PMT2 and the corresponding outputs of the first and/or second emission fibers 36a and 36b.

Figure 7:
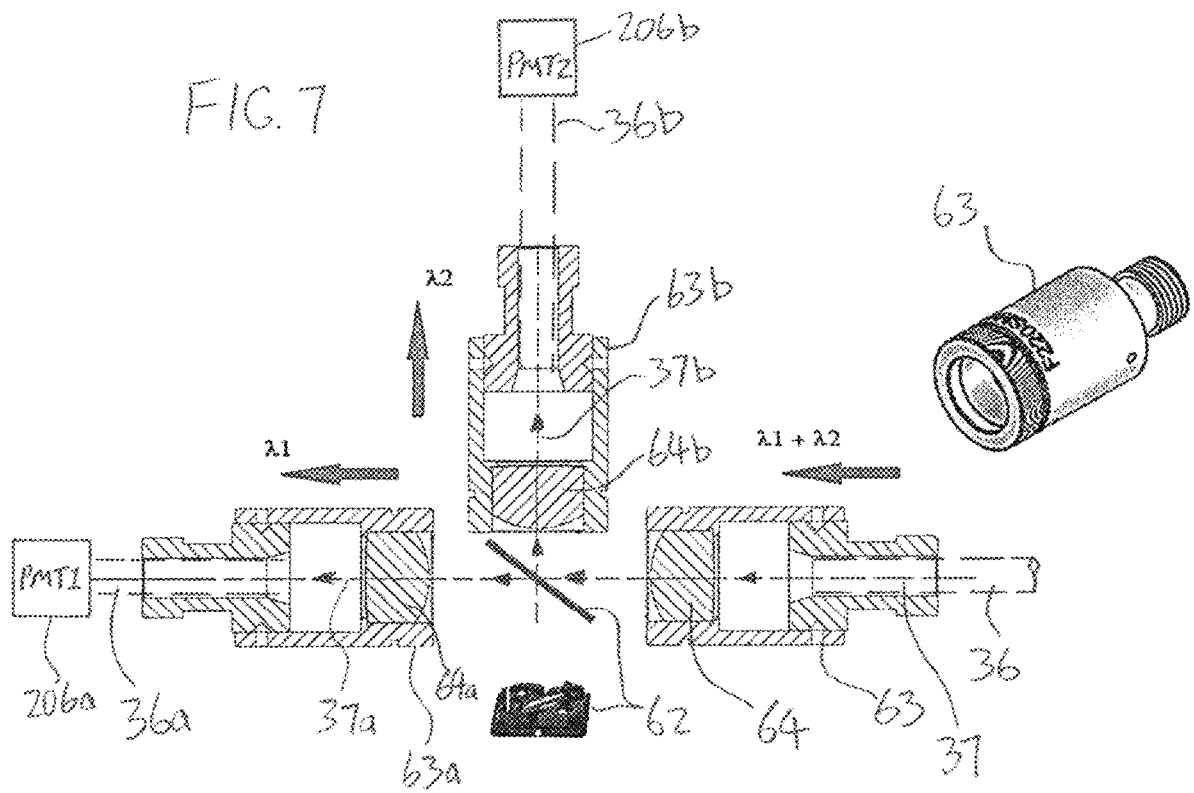
FIG. 7 schematically illustrates a two-color detection scheme in accordance with a second embodiment of the present invention.

FIG. 7 illustrates another embodiment of two-color detection, which includes a dichroic filter/beam-splitter 62 for splitting an emission signal 37 into two emission signals for fluorescence detection at two different wavelengths. The beam-splitter 62 splits the output signal 37 of the emission fiber 36 into the input signals 37a and 37b of a first emission fiber 36a and a second emission fiber 36b, respectively. The emission fiber 36 includes fluorescence at at least two wavelengths λ1 and λ2. In this embodiment, λ1 corresponds to the wavelength of the fluorescence of detected Dextran Ladder and λ2 corresponds to the wavelength of the fluorescence of detected glycan profile. The first emission fiber 36a routes emissions from the emission fiber 36 to a first PMT1 that detects fluorescence at λ1, and the second emission fiber 36b routes emissions from the emission fiber 36 to a second PMT2 that detects fluorescence at λ2. An example of an appropriate beam-splitter may be a model no. DMLP P425 longpass type Dichroic Mirror available from ThorLabs, Inc., which has a 45° angle of incident, a cutoff wavelength of 425 nm, with a transmission band of 440-700 nm, and a reflectance band of 380-410 nm. In addition, while not shown in FIG. 6, one or more band-pass filters may be provided between the PMT1 and/or PMT2 and the corresponding outputs of the first and/or second emission fibers 36a and 36b. As shown in FIG. 7, the ends of the optical fibers 36, 36a and 36b are inserted/supported in corresponding terminating optical couplers 63, 63a and 63b, which each has a collimating lens (64, 64a, 64b).

Referring to FIG. 5, the above described two-color detection configurations can be modified by implementing the above-noted beam-splitter 62 and/or combiner/splitter 61, emission fibers 36a and 36b, and another PMT in addition to the PMT 206 for the additional color detection.

Figure 14:
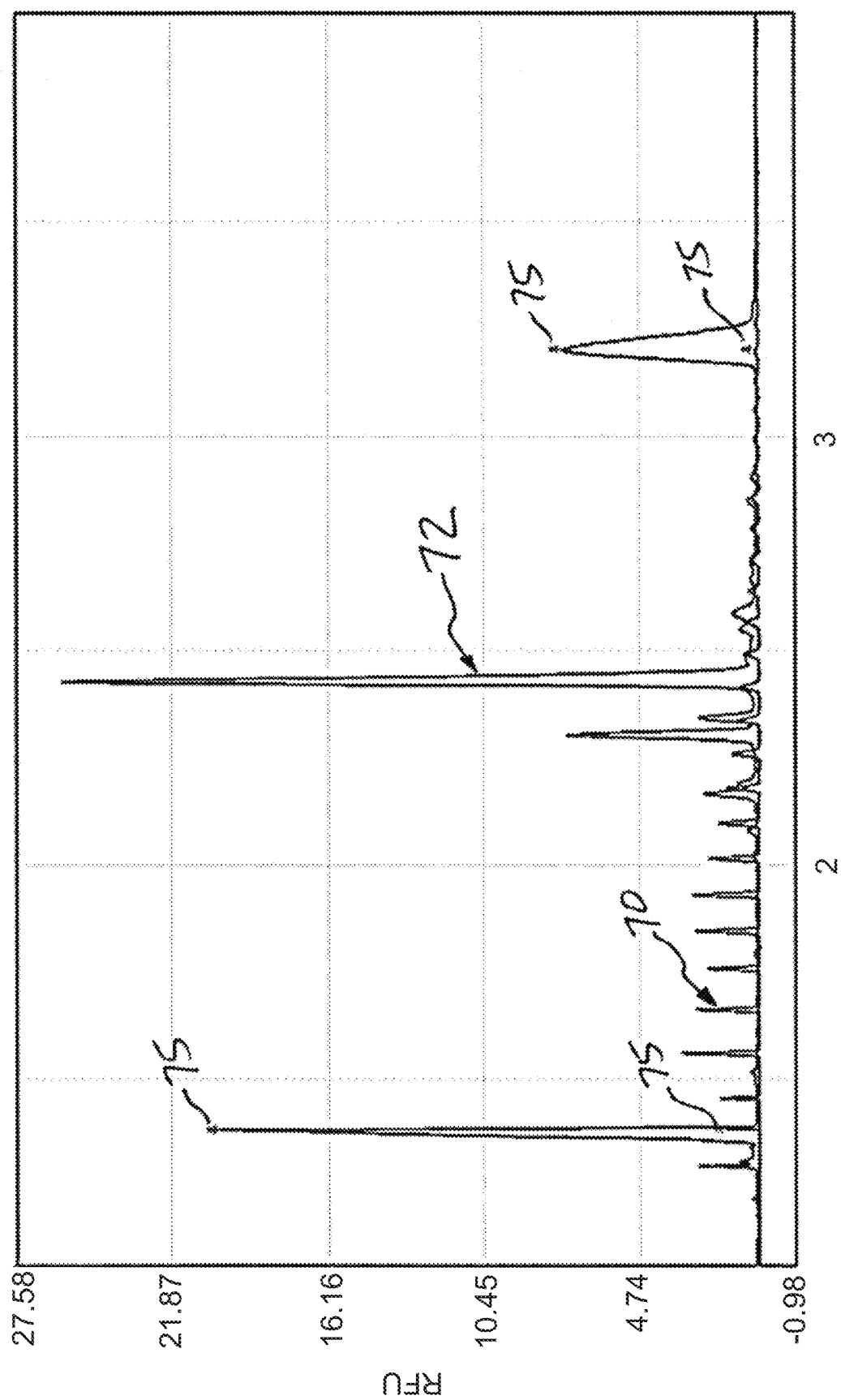
FIGS. 14 and 15 illustrate results of fluorescence detection of glycan profiling using a two-color detection scheme, by the inventive CE instrument and method in accordance with the present invention.
Figure 15:
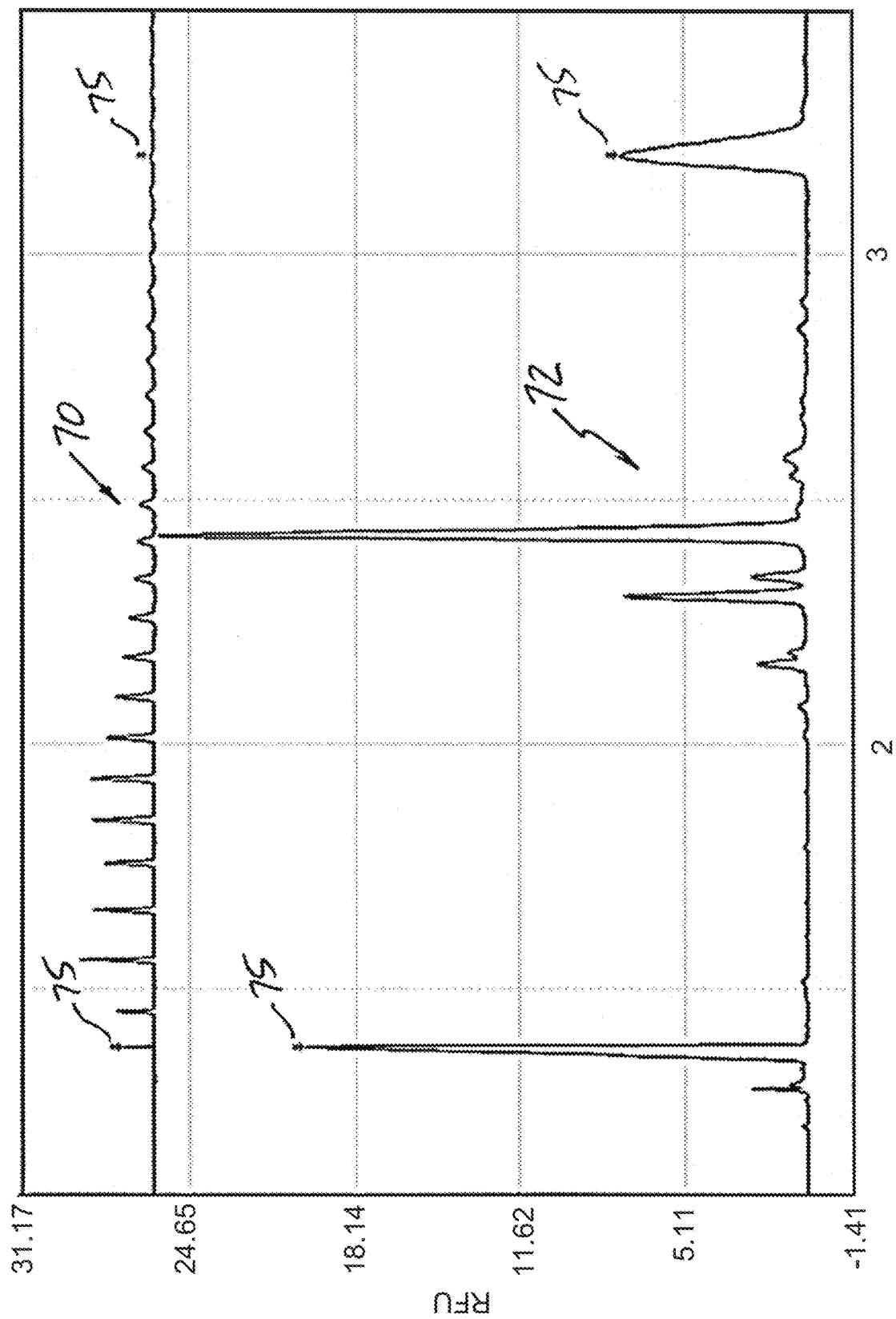

FIGS. 14-15 are results of detected fluorescence in connection with glycan profiling using the system 200 modified with two-color detection scheme and associated method discussed above. Specifically, FIG. 14 illustrates the detected fluorescence 70 for a Glycan Ladder (by PMT1 at λ1) transposed on the detected fluorescence 72 for a glycan sample 72 (by PMT2 at λ2). FIG. 15 illustrates the detected fluorescence 70 for the same Glycan Ladder (by PMT1 at λ1) and the detected fluorescence 72 for the same glycan sample (by PMT2 at λ2) displayed separately and aligned by arrows 75.

The two-color detection simplifies and shortens sample separation and detection into a single run and assures accurate data analysis for peak identification. The dual dye detection (i.e., two dye labeling) is a very robust and accurate way to provide reproducible peak identification and sizing for glycan profiling.

The simplicity of the micro-optical detection also provides flexibility in designing higher throughput (i.e. multi-channel, e.g., 4-12-channel) type gel-cartridge without the use of optics (excitation or emission optics) inside the cartridge assembly, hence reducing costs for the cartridge.

Accordingly, the new fluorescence fiber-based detection for the CE system in accordance with the present invention provides simplicity in design, ease of operation and lower cost consumable for glycan profiling. It provides a good solution particularly for the research and clinical diagnostic laboratories/industry that demands sustained and stable recurring revenue streams from both an installed base of instruments and recurring need for consumables such as testing reagents and buffer containing capillary cartridge.

While the invention has been particularly shown and described with reference to the preferred embodiments, it will be understood by those skilled in the art that various changes in form and detail may be made without departing from the spirit, scope, and teaching of the invention.

For example, the excitation radiation source could be, for example, LEDs, Laser Diodes (semiconductor solid-state lasers), pulsed lasers (e.g., solid state lasers, gas lasers, dye lasers, fiber lasers), or other sources of radiation. Alternate relative inexpensive light source for the present invention could be laser diodes in the visible, UV and/or infrared range. For example, laser diodes in the range of 200-900 nm, and more specifically in the range of 270-380 nm may be used, for example.

A person skilled in the art will recognize that the instrument incorporating the essence of this invention can also be used for bio molecular analysis other than glycan profiling analysis. For example, by altering the separation gel or buffer, the system can also be modified to analyze biomolecules like DNA, immunoassays, proteins, carbohydrates, and lipids.

By way of example and not limitation, the detection configuration of the present invention is described in connection with capillary electrophoresis and radiation induced fluorescence detection for glycan profiling. It is understood that the present invention is also applicable to detection of analytes separated based on bio-separation phenomenon other than electrophoresis, and detection of radiation emissions other than fluorescence emissions.

Instead of positioning the excitation fiber and emission fiber substantially coplanar with the axis of the separation channel at the detection zone, the excitation fiber or the emission fiber may be out of plane, without departing from the scope and spirit of the present invention.

Furthermore, while the separation channels in the described embodiments are defined by cylindrical columns or tubes, it is understood that the concepts of the present invention is equally applicable to separation channels defined by open channels, for example micro-channels defined by etching in a substrate.

Accordingly, the disclosed invention is to be considered merely as illustrative and limited in scope only as specified in the appended claims.

We claim:

1. A method of glycan profiling, comprising:

providing a separation channel having a first longitudinal axis along which a glycan sample undergoes separation into sample components, and a detection zone defined along the separation channel through which the sample components pass;

prior to subjecting the glycan sample to separation, the glycan sample is provided with a sample marker corresponding to a first fluorescence emission having a first characteristic wavelength, wherein the sample components are labeled by the sample marker for identification as the glycan sample undergoes separation, wherein the glycan sample is further provided with a reference marker corresponding to a second fluorescence emission having a second characteristic wavelength different from the first characteristic wavelength, wherein the reference marker provides a reference to facilitate identification of the sample components as the glycan sample undergoes separation;

providing a radiation source that provides an incident radiation to induce the first fluorescence emission from the sample marker having the first characteristic wavelength and the second fluorescence emission from the reference marker having the second characteristic wavelength, and wherein the sample marker comprises a first material that emits the first fluorescence emission when induced by the incident radiation, and the reference marker comprises a second material that emits the second fluorescence emission when induced by the incident radiation;

providing an incident light guide having a second longitudinal axis, directing the incident radiation from the radiation source to the detection zone along the separation channel;

providing a first detector, which detects the first fluorescence emission having the first characteristic wavelength, and a second detector, which detects the second fluorescence emission having the second characteristic wavelength;

providing an emission light guide having a third longitudinal axis, collecting and directing emitted radiation from the detection zone to a first emission fiber and a second emission fiber, wherein the first emission fiber routes emitted radiation of the first fluorescence emission having the first characteristic wavelength from the emission light guide to the first detector and the second emission fiber routes emitted radiation of the second fluorescence emission having the second characteristic wavelength from the emission light guide to the second detector; and subjecting the glycan sample to high voltage to effect electrophoresis to separate the glycan sample into the sample components along the separation channel, wherein the first detector detects the first fluorescence emission and the second detector detects the second fluorescence emission at the detection zone.

2. The method of claim 1, wherein the sample marker comprises a sample fluorophore and the reference marker comprises a reference fluorophore, wherein the sample fluorophore and the reference fluorophore are simultaneously subject to the incident radiation as they pass through the detection zone, and wherein the incident radiation induces emitted radiations in the form of the first and second fluorescence emissions of the sample marker and the reference marker as the sample components pass through the detection zone.

3. The method of claim 2, wherein the reference fluorophore provides a Dextran Ladder as the reference marker as the glycan sample undergoes separation.

4. The method of claim 2, wherein the first fluorescence emission having the first characteristic wavelength corresponds to fluorescence emission of detected glycan profile and the second fluorescence emission having the second characteristic wavelength corresponds to fluorescence emission of detected Dextran Ladder.

5. The method of claim 1, wherein the separation channel is a capillary channel defined in a capillary column, defining the detection zone.

6. The method of claim 1, wherein the emission light guide and the incident light guide are positioned on opposite sides of the separation channel, and wherein the first, second and third longitudinal axes are substantially coplanar at the detection zone.

7. The method of claim 6, wherein at least one of the second and third longitudinal axes is not perpendicular to the first longitudinal axis.

8. The method of claim 7, wherein the incident light guide comprises a first optical fiber having a terminating integral ball-end structure, and the emission light guide comprises a second optical fiber having a terminating integral ball-end structure, and wherein the ball-end structures do not touch the exterior of the separation channel.

9. The method of claim 1, wherein the emission light guide directs the emitted radiation from the detection zone to the first emission fiber and the second emission fiber via one of (a) a fiber combiner routing from an output of the emission light guide the emitted radiation of the first fluorescence emission having the first characteristic wavelength to the first emission fiber and the emitted radiation of the second fluorescence emission having the second characteristic wavelength to the second emission fiber; or (b) a beam-splitter splitting from the output of the emission light guide the emitted radiation of the first fluorescence emission having the first characteristic wavelength to the first emission fiber and the emitted radiation of the second fluorescence emission having the second characteristic wavelength to the second emission fiber.

10. The method of claim 1, wherein the glycan sample is N-Glycan.

11. An electrophoresis system for profiling glycan, structured and configured to perform the method of claim 1.

12. A method of glycan profiling, comprising:

providing a separation channel having a first longitudinal axis along which a N-glycan sample undergoes separation into sample components, and a detection zone defined along the separation channel through which the sample components pass;

prior to subjecting the N-glycan sample to separation, the N-glycan sample is provided with a sample marker corresponding to a first fluorescence emission having a first characteristic wavelength, wherein the sample components are labeled by the sample marker for identification as the N-glycan sample undergoes separation, wherein the N-glycan sample is further provided with a reference marker corresponding to a second fluorescence emission having a second characteristic wavelength different from the first characteristic wavelength, wherein the reference marker provides a reference to facilitate identification of the sample components as the N-glycan sample undergoes separation;

providing a radiation source that provides an incident radiation to induce the first fluorescence emission from the sample marker having the first characteristic wavelength and the second fluorescence emission from the reference marker having the second characteristic wavelength, and wherein the sample marker comprises a first material that emits the first fluorescence emission when induced by the incident radiation, and the reference marker comprises a second material that emits the second fluorescence emission when induced by the incident radiation;

providing an incident light guide having a second longitudinal axis, directing the incident radiation from the radiation source to the detection zone along the separation channel;

providing a first detector detecting the first fluorescence emission having the first characteristic wavelength, and a second detector detecting the second fluorescence emission having the second characteristic wavelength;

providing an emission light guide having a third longitudinal axis, collecting and directing emitted radiation from the detection zone to a first emission fiber and a second emission fiber, wherein the first emission fiber routes emitted radiation of the first fluorescence emission having the first characteristic wavelength from the emission light guide to the first detector and the second emission fiber routes emitted radiation of the second fluorescence emission having the second characteristic wavelength from the emission light guide to the second detector; and subjecting the N-glycan sample to high voltage to effect electrophoresis to separate the N-glycan sample into the sample components along the separation channel, wherein the first detector detects the first fluorescence emission and the second detector detects the second fluorescence emission at the detection zone.

13. The method of claim 12, wherein the sample marker comprises a sample fluorophore and the reference marker comprises a reference fluorophore, wherein the sample fluorophore and the reference fluorophore are simultaneously subject to the incident radiation as they pass through the detection zone, and wherein the incident radiation induces emitted radiations in the form of the first and second fluorescence emissions of the sample marker and the reference marker as the sample components pass through the detection zone.

14. The method of claim 13, wherein the reference fluorophore provides a Dextran Ladder as the reference marker as the N-glycan sample undergoes separation.

15. The method of claim 13, wherein the first fluorescence emission having the first characteristic wavelength corresponds to fluorescence emission of detected N-glycan profile and the second fluorescence emission having the second characteristic wavelength corresponds to fluorescence emission of detected Dextran Ladder.

16. The method of claim 12, wherein the separation channel is a capillary channel defined in a capillary column, defining the detection zone.

17. The method of claim 12, wherein the emission light guide and the incident light guide are positioned on opposite sides of the separation channel, and wherein the first, second and third longitudinal axes are substantially coplanar at the detection zone.

18. The method of claim 17, wherein at least one of the second and third longitudinal axes is not perpendicular to the first longitudinal axis.

19. The method of claim 18, wherein the incident light guide comprises a first optical fiber having a terminating integral ball-end structure, and the emission light guide comprises a second optical fiber having a terminating integral ball-end structure, and wherein the ball-end structures do not touch the exterior of the separation channel.

20. The method of claim 12, wherein the emission light guide directs the emitted radiation from the detection zone to the first emission fiber and the second emission fiber via one of (a) a fiber combiner routing from an output of the emission light guide the emitted radiation of the first fluorescence emission having the first characteristic wavelength to the first emission fiber and the emitted radiation of the second fluorescence emission having the second characteristic wavelength to the second emission fiber; or (b) a beam-splitter splitting from the output of the emission light guide the emitted radiation of the first fluorescence emission having the first characteristic wavelength to the first emission fiber and the emitted radiation of the second fluorescence emission having the second characteristic wavelength to the second emission fiber.

* * * * *